(12) United States Patent
Arisaka et al.

(10) Patent No.: US 11,205,792 B2
(45) Date of Patent: Dec. 21, 2021

(54) FUEL CELL SYSTEM AND CONTROL METHOD FOR SAME

(71) Applicant: NISSAN MOTOR CO., LTD., Yokohama (JP)

(72) Inventors: Tomoko Arisaka, Kanagawa (JP); Shinji Miyagawa, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 16/635,252

(22) PCT Filed: Jul. 31, 2017

(86) PCT No.: PCT/JP2017/027768
§ 371 (c)(1),
(2) Date: Jan. 30, 2020

(87) PCT Pub. No.: WO2019/026156
PCT Pub. Date: Feb. 7, 2019

(65) Prior Publication Data
US 2020/0381755 A1    Dec. 3, 2020

(51) Int. Cl.
| | | |
|---|---|---|
| *H01M 8/04225* | (2016.01) | |
| *H01M 8/04302* | (2016.01) | |
| *H01M 8/0444* | (2016.01) | |
| *H01M 8/04746* | (2016.01) | |
| *H01M 8/04014* | (2016.01) | |

(Continued)

(52) U.S. Cl.
CPC ... *H01M 8/04776* (2013.01); *H01M 8/04022* (2013.01); *H01M 8/0444* (2013.01); *H01M 8/04201* (2013.01); *H01M 8/04225* (2016.02); *H01M 8/04302* (2016.02); *H01M 8/04373* (2013.01); *H01M 8/04701* (2013.01); *H01M 8/0618* (2013.01)

(58) Field of Classification Search
CPC ...................................................... H01M 8/04
See application file for complete search history.

(56) References Cited

U.S. PATENT DOCUMENTS 6,077,620 A * 6/2000 Pettit .................... C01B 3/48
429/425
9,209,469 B2  12/2015 Otsuka et al.
(Continued)

FOREIGN PATENT DOCUMENTS

CN            1849723 A     10/2006
CN          103119770 A      5/2013
(Continued)

*Primary Examiner* — James Lee
(74) *Attorney, Agent, or Firm* — Foley & Lardner LLP

(57) ABSTRACT

A fuel cell system includes: a fuel cell; a catalyst combustor configured to receive raw fuel and oxidant and generate combustion gas of the raw fuel; and a control unit configured to control supplying of the raw fuel and the oxidant to the catalyst combustor. The control unit is configured to supply the raw fuel and the oxidant to the catalyst combustor at the time of startup of the fuel cell system, and when a reforming reaction of the raw fuel turns dominant over a combustion reaction of the raw fuel at the catalyst combustor, increase an air-fuel ratio that is a ratio of the oxidant to the raw fuel, compared to the air-fuel ratio before the reforming reaction turns dominant.

13 Claims, 11 Drawing Sheets

(51) Int. Cl.
    *H01M 8/04082*    (2016.01)
    *H01M 8/0432*     (2016.01)
    *H01M 8/04701*    (2016.01)
    *H01M 8/0612*     (2016.01)

(56) References Cited

U.S. PATENT DOCUMENTS

2002/0146604 A1* 10/2002 Matoba ................ H01M 8/241
                                                                                   429/423
2013/0196239 A1    8/2013 Otsuka et al.

FOREIGN PATENT DOCUMENTS

| EP | 1 248 312 A2 | 10/2002 |
|---|---|---|
| EP | 1 850 415 A1 | 10/2007 |
| JP | 2008-293756 A | 12/2008 |
| JP | 2012-79422 A | 4/2012 |
| JP | 2014-26982 A | 2/2014 |
| JP | 2016-207413 A | 12/2016 |

* cited by examiner

FUEL CELL SYSTEM AND CONTROL METHOD FOR SAME

TECHNICAL FIELD

The present invention relates to a fuel cell system and control methods for the same that are configured to generate the amount of heat for warming-up with a combustor.

BACKGROUND ART

JP2008-293756 discloses a fuel cell system including a combustor containing catalyst for combustion promotion, and the fuel cell system is configured to supply hydrogen as fuel and air to this combustor at the time of startup of the system and heat a fuel cell with the amount of heat generated from combustion of the fuel so as to promote warming-up of the fuel cells (paragraphs 0068, 0069).

SUMMARY OF INVENTION

For quick warming up of the fuel cell, the fuel cell system is required to increase the temperature of the catalyst in the combustor speedily. Unlike the combustion of hydrogen, combustion of raw fuel before the fuel treatment by the combustor may lead to an emission increase of air pollutants during the temperature rise of the catalyst. Just supplying raw fuel to the combustor for combustion therefore leads to a concern of increasing the air pollutants released into the atmosphere.

The present invention provides fuel cell systems and control methods for the same to solve the above problem.

A fuel cell system according to one embodiment of the present invention is a fuel cell system comprising a fuel cell, a catalyst combustor configured to receive raw fuel and oxidant and generate combustion gas of the raw fuel, and a control unit configured to control supplying of the raw fuel and the oxidant to the catalyst combustor, the control unit being configured to supply the raw fuel and the oxidant to the catalyst combustor at the time of startup of the fuel cell system, and when a reforming reaction of the raw fuel turns dominant over a combustion reaction of the raw fuel at the catalyst combustor, increase an air-fuel ratio that is a ratio of the oxidant to the raw fuel, compared to the air-fuel ratio before the reforming reaction turns dominant.

The present invention provides a control method of a fuel cell system according to other embodiment.

DESCRIPTION OF EMBODIMENTS

The following describes one embodiment of the present invention, with reference to the attached drawings.

(Overall Configuration of Fuel Cell System)

Figure 1:
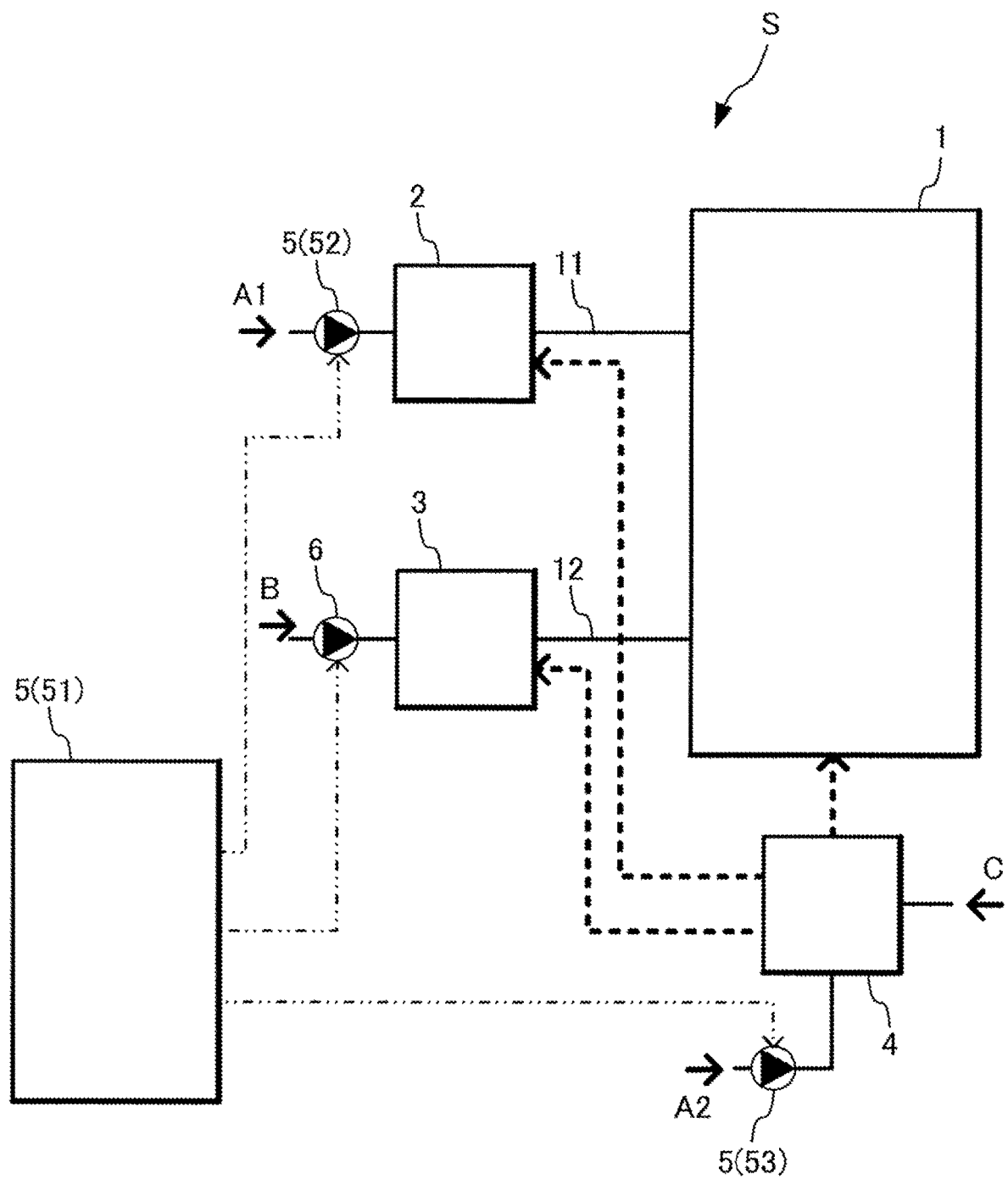
FIG. 1 schematically shows the configuration of a fuel cell system according to one embodiment of the present invention.

FIG. 1 schematically shows the configuration of a fuel cell system S according to one embodiment of the present invention.

The fuel cell system (hereinafter this may be called a "fuel cell system" or simply a "system") S according to the present embodiment includes a fuel cell stack 1, a fuel treating unit 2, an oxidant-gas heater 3, a catalyst combustor (hereinafter simply called a "combustor") 4, and a control unit 5.

The fuel cell stack (hereinafter this may be called simply a "stack") 1 includes the lamination of a plurality of fuel cells or fuel cell unit cells. The fuel cells as the source of generating power are solid-oxide fuel cells (SOFC), for example. In the fuel cell stack 1, the anode side includes: an anode-gas flow path 11 to supply fuel gas to the anode of the fuel cell; and an anode off-gas flow path 11exh (not shown in FIG. 1) for the anode off-gas emitted from the anode after the power-generation reaction. The cathode side includes a cathode-gas flow path 12 to supply oxidant gas to the cathode of the fuel cell; and a cathode off-gas flow path 12exh (not shown) for the cathode off-gas emitted from the cathode after the power-generation reaction.

The fuel treating unit 2 treats raw fuel as primary fuel to generate fuel gas used for the power-generation reaction at the fuel cell. The fuel treating unit 2 is disposed on the anode-gas flow path 11 to receive the supplied raw fuel (arrow A1). The raw fuel is oxygenated fuel, for example, and is ethanol in this embodiment.

The oxidant-gas heater 3 heats oxidant-gas. The oxidant-gas heater 3 is disposed on the cathode-gas flow path 12 to receive the supplied oxidant-gas (arrow B). The oxidant gas is air, for example. To this end, ambient air can be supplied to the cathode of the fuel cell to supply oxygen for the power-generation reaction to the cathode. The system includes an air suction unit 6 to suck oxidant gas or air into the cathode-gas flow path 12 from the atmosphere, and the air suction unit 6 may be an air compressor or a blower disposed close to the opening end of the cathode-gas flow path 12, for example.

The power-generation reaction at the anode and the cathode of the solid-oxide fuel cell can be represented by the following formulae:

$$\text{Anode: } 2H_2 + 4O^{2-} \rightarrow 2H_2O + 4e^- \qquad (1.1);\text{ and}$$

$$\text{Cathode: } O_2 + 4e^- 2O^{2-} \qquad (1.2).$$

The combustor 4 combusts the raw fuel of the fuel cell to generate combustion gas. The combustor 4 receives the supplied raw fuel (arrow A2) and receives the supplied oxidant (arrow C). The amount of heat that the combustion gas has is supplied not only to the fuel cell stack 1 but also to the fuel treating unit 2 and the oxidant-gas heater 3. Thick dashed lines in FIG. 1 indicate the transfer of the amount of heat from the combustor 4 to the fuel cell stack 1, the fuel treating unit 2 and the oxidant-gas heater 3.

The control unit 5 controls the supplying of raw fuel and oxidant to the fuel treating unit 2, the oxidant-gas heater 3 and the combustor 4, and can be configured to include an electronic control unit for this purpose. The control unit 5 in this embodiment includes a controller 51 configured as the electronic control unit. The control unit 5 includes a main fuel-supplying unit 52 to supply raw fuel to the fuel treating unit 2 and a sub fuel-supplying unit 53 to supply raw fuel to the combustor 4, and both of these fuel supplying units 52 and 53 may be injectors (first fuel injector 52 and second fuel injector 53). These first fuel injector 52 and second fuel injector 53 operate in accordance with an instruction signal from the controller 51 so as to supply raw fuel to the fuel treating unit 2 and the combustor 4, respectively, continuously or intermittently.

At the time of startup of the fuel cell system S, the controller 51 executes control to promote the warming-up of the fuel cell system S. The controller 51 determines whether the fuel treating unit 2 is ready for the treatment of raw fuel. When the fuel treating unit 2 is ready for the treatment of raw fuel, the controller 51 controls the first fuel injector 52 to supply raw fuel to the fuel cell system S. When the fuel treating unit 2 is not ready for the treatment of raw fuel, the controller 51 controls the second fuel injector 53 to supply raw fuel to the fuel cell system S. This enables, when the fuel treating unit 2 is not ready for the treatment of raw fuel, heating of the fuel cell stack 1 and the fuel treating unit 2 with the combustion gas generated at the combustor 4 as the heat source so as to promote the warming-up of the fuel cell system S.

Figure 2:
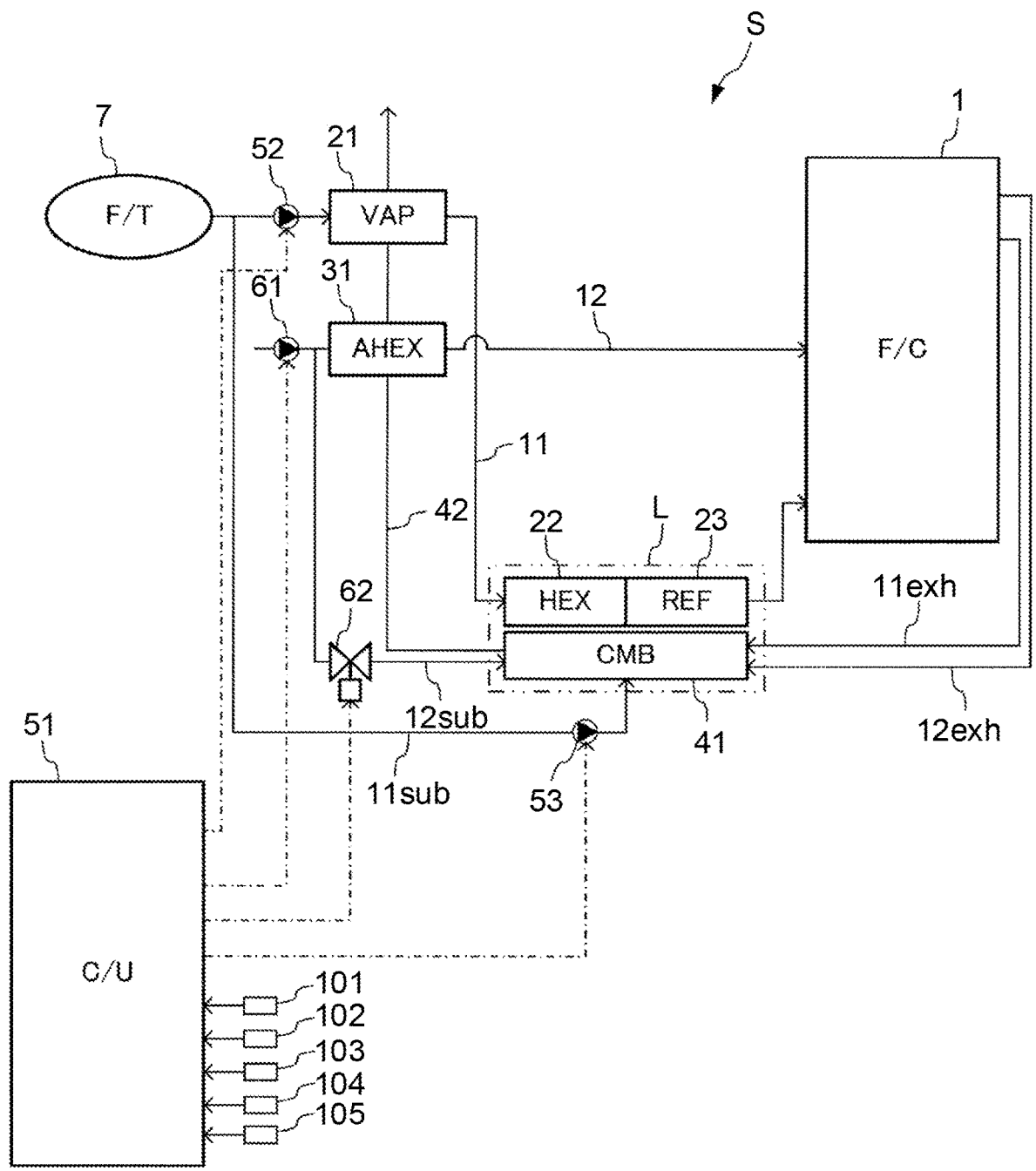
FIG. 2 shows the configuration of the fuel cell system in more details.

FIG. 2 shows the configuration of the fuel cell system S in more details.

The fuel cell system S includes a solid-oxide fuel cell (SOFC) as the power-generation source, and includes a fuel tank 7 that is mountable on a vehicle. In this embodiment, raw fuel as the primary fuel is oxygenated fuel, e.g., ethanol, and the fuel tank 7 stores the mixture of the oxygenated fuel and water (ethanol aqueous solution containing 45 volume % of ethanol, for example). The fuel tank 7 and the fuel cell stack 1 connect via the anode-gas flow path 11. An evaporator 21, a fuel heat exchanger 22 and a reformer 23 are disposed in this order from the upstream of the gas-flowing direction of the anode-gas flow path 11. A branch fuel flow path 11sub branches off from the anode-gas flow path 11 upstream of the evaporator 21, and the branch fuel flow path 11sub connects to the combustor (catalyst combustor) 41. The first fuel injector 52 is disposed between the branching point of the branch fuel flow path 11sub and the evaporator 21 on the anode-gas flow path 11, and the second fuel injector 53 is disposed on the branch fuel flow path 11sub. This enables switching of the flowing of raw fuel between the anode-gas flow path 11 and the branch fuel flow path 11sub. The evaporator 21, the fuel heat exchanger 22 and the reformer 23 make up the fuel treating unit 2 of the fuel cell system S to treat raw fuel and generate fuel gas for the fuel cell.

The evaporator 21 receives ethanol aqueous solution from the fuel tank 7, and heats the ethanol aqueous solution to evaporate both of liquid ethanol and water and generate ethanol gas and water vapor.

The fuel heat exchanger 22 receives the amount of heat generated by combustion from the combustor 41 to heat ethanol gas and water vapor.

The reformer 23 internally contains reforming catalyst to generate hydrogen as fuel gas from ethanol gas as the raw fuel by steam reforming. The steam reforming can be represented by the following formula. The steam reforming is endothermic reaction, and so requires the amount of heat supplied from the outside for reforming. The present embodiment is configured so that the combustor 41 combusts the fuel remaining in anode off-gas during reforming as well, and the amount of heat generated by the combustion is supplied to the reformer 23.

$$C_2H_5OH + 3H_2O \rightarrow 6H_2 + 2CO_2 \qquad (2)$$

The oxidant-gas heater 3 includes an air heat exchanger 31, and heats oxidant gas flowing through the cathode-gas flow path 12 by heat exchanging with the combustion gas supplied from the combustor 41 via a combustion-gas flow path 42. The present embodiment includes the air compressor 61 close to the opening end of the cathode-gas flow path 12 to suck ambient air as the oxidant gas into the cathode-gas flow path 12 via the air compressor 61. The sucked air at room temperature (e.g., 25° C.) is heated during the passage through the air heat exchanger 31 and then is supplied to the fuel cell stack 1.

The combustor 41 internally contains combustion catalyst including three elements of Pt (platinum), Pd (palladium), and Rh (rhodium), and receives ethanol aqueous solution via the branch fuel flow path 11sub and generates combustion gas through catalytic combustion of ethanol as the raw fuel. In the present embodiment, the combustor 41 and the evaporator 21 connect via the combustion-gas flow path 42, and heats the evaporator 21 by the amount of heat of the combustion gas. The fuel heat exchanger 22 and the reformer 23 are accommodated in a case (indicated with the dashed-two dotted line L) shared with the combustor 41 so that the amount of heat of the combustion gas is transmitted to the fuel heat exchanger 22 and the reformer 23 inside of this shared case L. In this way, the present embodiment heats the fuel cell stack 1 as well as the fuel treating unit 2 with the combustion gas generated at the combustor 41. In another embodiment, the combustor 41 may be a combustor dedicated to any one of the fuel cell stack 1 and the fuel treating unit 2 for heating.

The combustor 41 in the present embodiment connects to a flow path (hereinafter called a "branch air flow path") 12sub that branches off from the cathode-gas flow path 12 downstream of the air compressor 61. The branch air flow path 12sub has a flow-rate control valve 62 to control the flow rate of oxidant (air) flowing through the flow path 12sub. The combustor 41 then connects to the anode off-gas flow path 11exh and the cathode off-gas flow path 12exh extending from the fuel cell stack 1. This configuration opens the flow-rate control valve 62 to supply oxidant to the combustor 41 via the branch air flow path 12sub at the timing of startup of the fuel cell system S and before the reformer 23 reaches the reformable temperature, and after reaching the reformable temperature, closes the flow-rate control valve 62 to supply oxidant (oxygen remaining in the anode off-gas) via the cathode off-gas flow path 12exh.

The reaction of raw fuel at the combustor 41 can be represented by the following formulae:

$$C_2H_5OH + \tfrac{1}{2}O_2 \rightarrow 2CO + 3H_2 \qquad (3.1);$$

$$CO + \tfrac{1}{2}O_2 \rightarrow CO_2 \qquad (3.2)$$

$$H_2 + \tfrac{1}{2}O_2 \rightarrow H_2O \qquad (3.3)$$

$$C_2H_5OH \rightarrow CH_3CHO + H_2 \qquad (3.4); \text{ and}$$

$$CH_3CHO \rightarrow CH_4 + CO \qquad (3.5).$$

Among these formulae (3.1) to (3.5), formulae (3.1) to (3.3) represent the combustion reaction of the raw fuel, and formulae (3.4) and (3.5) represent the reforming reaction of the raw fuel. These formulae show that the progressing of the reforming reaction dominant over the combustion reaction will increase the emission of air pollutants such as hydrocarbons and carbon monoxide.

The electricity generated at the fuel cell stack 1 can be used for charging of a battery or for driving an external device, such as an electric motor or a motor generator. In one example, the fuel cell system S may be used for a vehicle driving system so that electricity generated by rated operation of the fuel cell stack 1 is charged into a battery, and the electricity according to the target driving force of the vehicle is supplied from the battery to a motor generator for travelling.

(Configuration of Control System)

The controller 51 controls various units and components used for the operation of the fuel cell system S, including the first fuel injector 52, the second fuel injector 53, the air compressor 61 and the flow-rate control valve 62. The controller 51 in the present embodiment is configured as an electronic control unit including a microcomputer made up of a central processing unit, various types of memories, such as ROM and RAM, an input/output interface, and the like.

For the normal operation after finishing the startup, the controller 51 sets the supplying amount of the raw fuel required for the rated operation of the fuel cell stack 1, i.e., the operation at the maximum power-generation output (hereinafter this supplying amount will be called a "normal supplying amount"), and supplies the raw fuel of the normal supplying amount to the fuel cell system S via the first fuel injector 52.

At the time of startup of the fuel cell system S, the controller 51 executes startup control for warming-up of the entire fuel cell system S. This startup control increases the temperature of the fuel cell stack 1, which is at a low temperature during stopping (e.g., at a room temperature), to the operating temperature. The operating temperature of the solid-oxide fuel cell is about 800 to 1000° C., and the present embodiment increases the temperature of the fuel cell stack 1 and the fuel cells to 600 to 700° C.

The controller 51 receives, as information on the startup control, various signals including a signal from a stack temperature sensor 101 to detect the stack temperature $T_{stk}$, a signal from a combustor temperature sensor 102 to detect the combustor temperature $T_{cmb}$, a signal from a reformer temperature sensor 103 to detect the reformer temperature $T_{ref}$, and a signal from a discharged gas sensor 104 to detect the concentration of discharged gas $C_{cmb}$.

The stack temperature $T_{stk}$ is an index indicating the temperature of the fuel cell stack 1 or the fuel cells. The present embodiment includes the stack temperature sensor 101 near the outlet of the cathode off-gas of the fuel cell stack 1, and sets the temperature detected by the stack temperature sensor 101 as the stack temperature $T_{stk}$.

The combustor temperature $T_{cmb}$ is the temperature of the combustor 41. The present embodiment includes the combustor temperature sensor 102 on the combustion-gas flow path 42 downstream of the combustor 41, and sets the temperature detected by the combustor temperature sensor 102, i.e., the temperature at the exit of the combustor 41 as the combustor temperature $T_{cmb}$.

The reformer temperature $T_{ref}$ is the temperature of the reformer 23. The present embodiment includes the reformer temperature sensor 103 on the anode-gas flow path 11 downstream of the reformer 23, and sets the temperature detected by the reformer temperature sensor 103 as the reformer temperature $T_{ref}$.

The discharged gas concentration $C_{cmb}$ is the concentration of a specific gas component in the combustion gas generated at the combustor 41. Among CO, $CO_2$, $CH_4$, $H_2$, $H_2O$, and $CH_3CHO$ that are potential components of the combustion gas, the present embodiment sets at least one type of gas components of CO, $CH_4$, $H_2$, and $CH_3CHO$ that are generated as the resultants of the reforming reaction as the specific gas component. The present embodiment includes the discharged gas sensor 104 on the combustion-gas flow path 42 between the combustor 41 and the air heat exchanger 31, and sets the concentration detected by the discharged gas sensor 104 as the discharged gas concentration $C_{cmb}$.

(Operation of Fuel Cell System)

Figure 3:
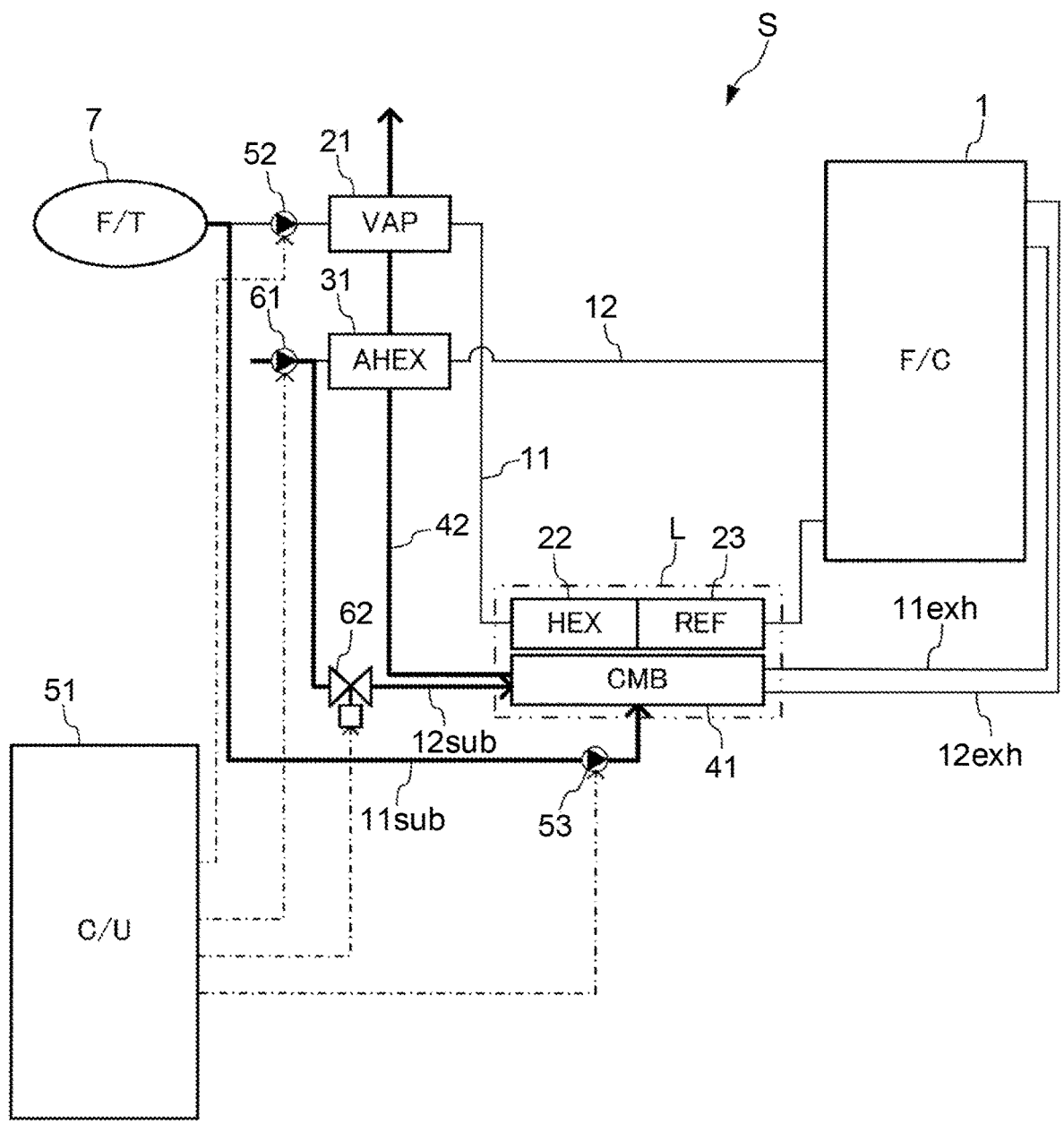
FIG. 3 shows the operating state of the fuel cell system at the time of startup.
Figure 4:
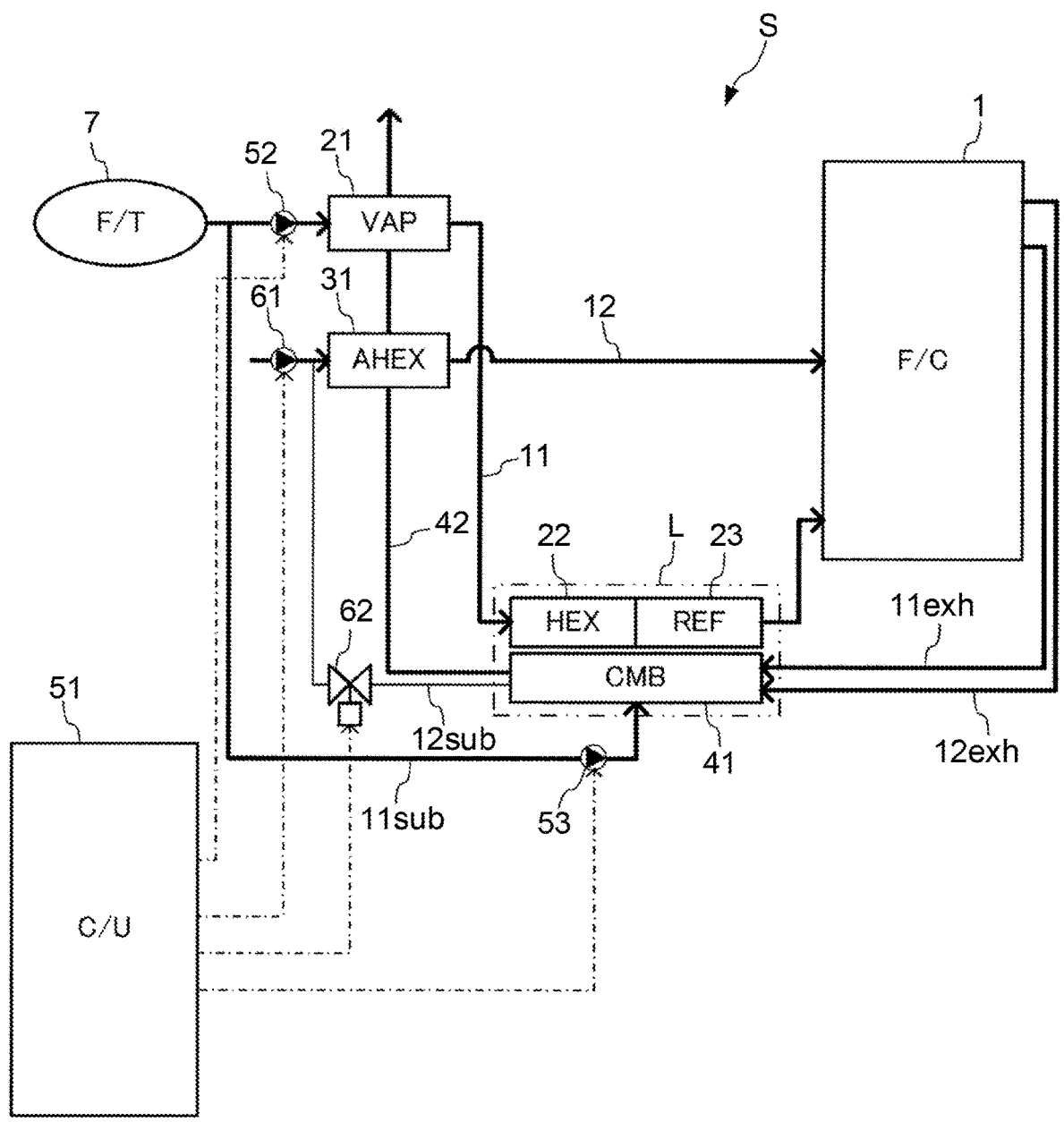
FIG. 4 shows the normal operating state of the fuel cell system.

FIG. 3 and FIG. 4 show the operating state of the fuel cell system S. FIG. 3 shows the operating state of the fuel cell system S at the time of startup, and FIG. 4 shows the normal operating state after finishing of the startup. These drawings show the anode-side flow path and the cathode-side flow path so that the flow path where the gas is flowing is thick solid lines and the flow path where the flowing of the gas is stopping is the thin solid lines.

At the time of startup, supplying of the raw fuel via the first fuel injector 52 stops, and the raw fuel required for warming up of the fuel cell stack 1 is supplied to the combustor 41 via the second fuel injector 53 (FIG. 3). The air compressor 61 starts to operate, and the flow-rate control valve 62 opens so as to supply oxidant (air) to the combustor 41 via the branch air flow path 12$sub$. The amount of heat generated from combustion of the raw fuel heats the fuel heat exchanger 22 and the reformer 23, and the combustion gas is supplied to the air heat exchanger 31 and the evaporator 21 via the combustion-gas flow path 42. This heats the fuel cell stack 1 as well as the evaporator 21, the fuel heat exchanger 22, the reformer 23 and the air heat exchanger 31, so as to promote the warming-up of the entire fuel cell system S.

During the normal operation, the raw fuel of the normal supplying amount required for the rated operation of the fuel cell stack 1 is supplied to the fuel cell system S via the first fuel injector 52 to operate the fuel cell stack 1 at the rated output (FIG. 4). The combustor 41 combusts the fuel remaining in the anode off-gas to supply the amount of heat required for reforming to the reformer 23, and the combustion gas of the remaining gas is supplied to the air heat exchanger 31 and the evaporator 21 to keep the entire fuel cell system S at a temperature required for the operation.

Referring now to the flowchart, the startup control of the fuel cell system S is described below in more details.

(Startup Control)

Figure 5:
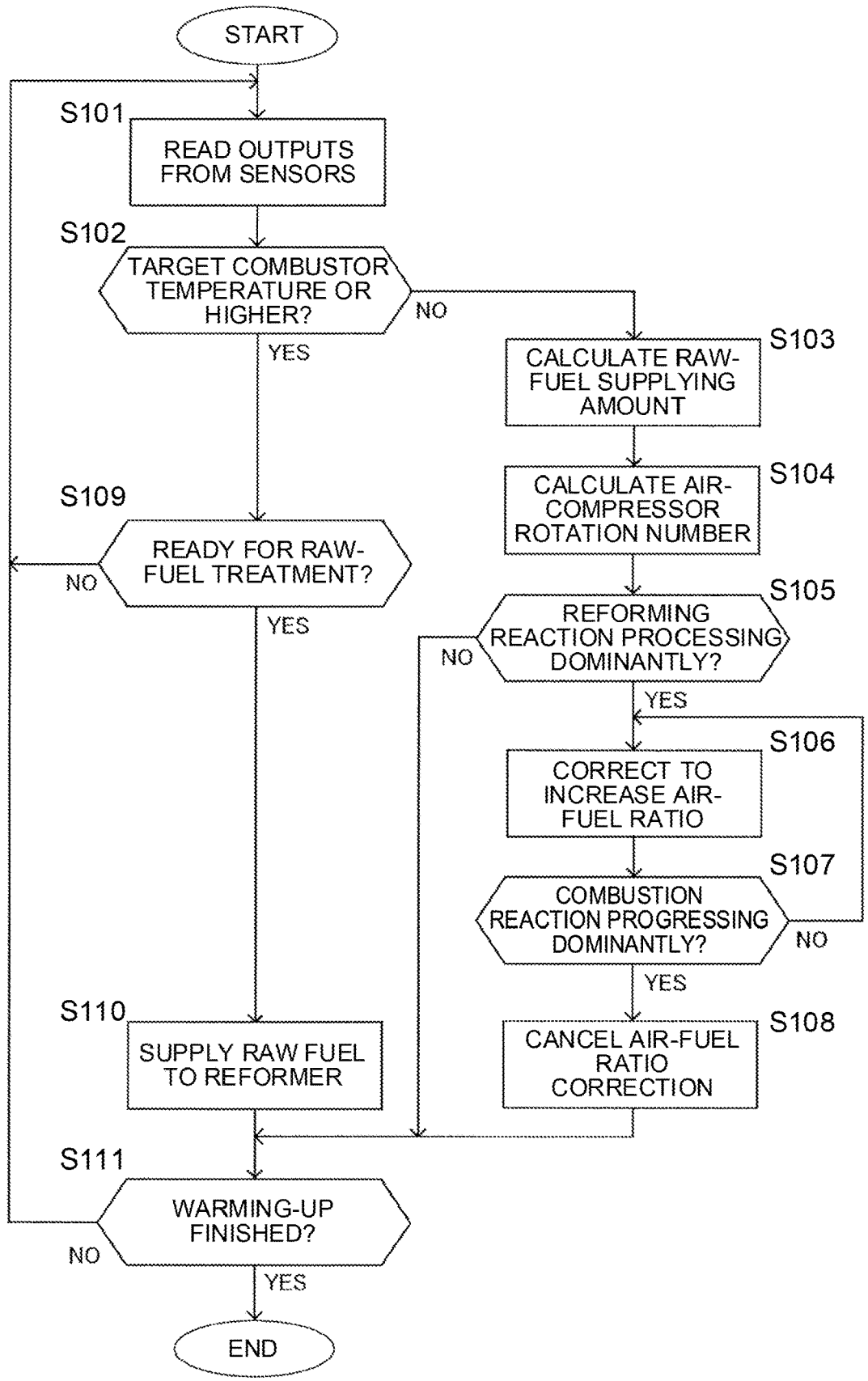
FIG. 5 is a flowchart showing the procedure of the startup control according to one embodiment of the present invention.

FIG. 5 is a flowchart showing the procedure of the startup control of the fuel cell system S according to the present embodiment.

In response to the driver's operation of a startup switch 105, the controller 51 receives a startup request signal from the startup switch 105. Then a predetermined program makes the controller 51 execute the startup control of the fuel cell system S in accordance with the procedure shown in the flowchart of FIG. 5. The controller 51 starts the startup control in response to the receiving of the startup request signal, and ends the startup control in response to a determination that the warming up of the fuel cell stack 1 or the fuel cells finishes.

At S101, the controller 51 reads the outputs from various sensors relating to the startup control. More specifically the controller 51 reads the stack temperature $T_{stk}$, the combustor temperature $T_{cmb}$, the reformer temperature $T_{ref}$, and the discharged gas concentration $C_{cmb}$.

At S102, the controller 51 determines whether the temperature $T_{cmb}$ of the combustor 41 reaches the target value $T_{cmb\_t}$ or not. When the combustor temperature $T_{cmb}$ reaches the target value $T_{cmb\_t}$, the procedure shifts to S109. When it does not reach the target value $T_{cmb\_t}$, the procedure shifts to S103. The target value $T_{cmb\_t}$ of the combustor temperature $T_{cmb}$ is 800° C., for example.

At S103, the controller 51 calculates the supplying amount $Q_{f\_str}$ of the raw fuel to be supplied to the combustor 41 at the time of startup (hereinafter this supplying amount is called "startup supplying amount"). The startup supplying amount $Q_{f\_str}$ can be set in accordance with the target temperature (e.g., 800° C.) of the combustion gas. Then the controller 51 calculates the supplying amount of the raw fuel capable of generating the amount of heat required to increase the temperature of the combustion gas to the target temperature as the startup supplying amount $Q_{f\_str}$. Instead of calculating the startup supplying amount $Q_{f\_str}$, the startup supplying amount $Q_{f\_str}$ may be set beforehand as the corresponding amount determined through the experiment, for example.

At S104, the controller 51 calculates the target number of revolutions of the air compressor 61 at the time of startup (hereinafter this number of revolutions is called a "compressor target number of revolutions") $N_{cmp\_t}$. The compressor target number of revolutions $N_{cmp\_t}$ is the number of revolutions of the air compressor 61 capable of supplying the amount of air to the combustor 41 required to keep the air-fuel ratio for the raw fuel of the startup supplying amount $Q_{f\_str}$ at a predetermined value (hereinafter called a "startup target air-fuel ratio"). The controller 51 of the present embodiment stores map data representing the compressor target number of revolutions $N_{cmp\_t}$ in association with the startup supplying amount $Q_{f\_str}$, and searches this map data based on the startup supplying amount $Q_{f\_str}$ to calculate the compressor target number of revolutions $N_{cmp\_t}$.

At S105, the controller 51 determines whether the reforming reaction represented by Formulae (3.4) and (3.5) progresses dominantly over the combustion reaction represented by Formulae (3.1) to (3.3) or not for the reactions generated at the combustor 41. To this end, the present embodiment determines whether the discharged gas concentration $C_{cmb}$ that is the concentration of the specific gas component exceeds a predetermined value $C_{cmb\_thr}$ or not based on the output of the discharged gas sensor 104. When the discharged gas concentration $C_{cmb}$ exceeds the predetermined value $C_{cmb\_thr}$, the procedure shifts to S106 because the reforming reaction is dominant. When the discharged gas concentration $C_{cmb}$ is the predetermined value $C_{cmb\_thr}$ or lower, the procedure shifts to S111 because the combustion reaction is dominant.

At S106, the controller 51 increases the air-fuel ratio at the combustor 41. Note here that the "air-fuel ratio" refers to the ratio of the mass of oxidant (air) to the mass of the raw fuel (ethanol) supplied to the combustor 41. The present embodiment increases the amount of air supplied to the combustor 41 via the branch air flow path 12sub to increase the air-fuel ratio (hereinafter the increased air-fuel ratio may be called a "corrected startup air-fuel ratio"). Specifically the present embodiment corrects the compressor target number of revolutions $N_{cmp\_t}$ to increase so as to increase the discharge amount from the air compressor 61. In another embodiment, the opening degree of the flow-rate control valve 62 may increase to increase the amount of air supplied to the combustor 41.

At S107, the controller 51 determines whether the combustion reaction represented by Formulae (3.1) to (3.3) progresses dominantly over the reforming reaction represented by Formulae (3.4) and (3.5) or not for the reaction generated at the combustor 41. Specifically when the controller 51 determines at Step S105 that the discharged gas concentration $C_{cmb}$ exceeds the predetermined value $C_{cmb\_thr}$, meaning that the reforming reaction turns dominant over the combustion reaction, the controller 51 increases the air-fuel ratio at S106 to reduce the discharged gas concentration $C_{cmb}$. Then the controller 51 determines whether the decreased rate $\Delta C_{cmb}$ decreases to a predetermined value $\Delta C_{cmb\_thr}$ or not. When the decreased rate $\Delta C_{cmb}$ of the discharged gas concentration $C_{cmb}$ decreases to the predetermined value $\Delta C_{cmb\_thr}$, the procedure shifts to S108 because the combustion reaction turns dominant. When this does not decrease to the predetermined value, the procedure returns to S106, because the reforming reaction is still dominant, to repeatedly execute the processing at S106 and S107.

At S108, the controller 51 cancels the correction to increase the air-fuel ratio at S106, and returns the air-fuel ratio at the combustor 41 to the initial startup target air-fuel ratio. The present embodiment decreases the compressor target number of revolutions $N_{cmp\_t}$ so as to decrease the amount of air supplied to the combustor 41 via the branch air flow path 12sub to the initial supplying amount. In another embodiment configured to control the flow-rate control valve 62 to increase the air-fuel ratio, the controller 51 decreases the opening degree of the flow-rate control valve 62.

At S109, the controller 51 determines whether the system is ready for treatment of the raw fuel or not. In the present embodiment, the controller 51 determines whether the reformer 23 is ready for reforming of the raw fuel or not. Specifically the controller 51 determines whether the reformer temperature $T_{ref}$ is a minimum temperature $T_{ref\_min}$ or higher, the minimum temperature $T_{ref\_min}$ being the temperature enabling the reforming by the reformer 23. When the reformer temperature $T_{ref}$ is the minimum temperature $T_{ref\_min}$ or higher, the procedure shifts to S110 because the system is ready for treatment of the raw fuel. When the reformer temperature $T_{ref}$ is less than the minimum temperature $T_{ref\_min}$, the procedure returns to S101 to repeatedly execute the processing of S101 to S108 because the system is not ready for treatment of the raw fuel, so as to keep the temperature $T_{cmb}$ of the combustor 41 at the target value $T_{cmb\_t}$ or higher.

The determination whether the system is ready for treatment of the raw fuel or not can be made not only based on whether the reformer 23 is ready for reforming of the raw fuel or not, but also, in addition to this determination or instead of this determination, based on whether the evaporator 21 is ready for evaporation of the raw fuel or not. Specifically the controller 51 determines whether the evaporator temperature $T_{vap}$ is a minimum temperature $T_{vap\_min}$ or higher, the minimum temperature $T_{vap\_min}$ being the temperature enabling the evaporation by the evaporator 21. When the evaporator temperature $T_{vap}$ is the minimum temperature $T_{vap\_min}$ or higher, the controller 51 determines that the system is ready for treatment of the raw fuel. The evaporator temperature $T_{vap}$ is the temperature of the evaporator 21. In one example, the system includes an evaporator-temperature sensor on the combustion-gas flow path 42 downstream of the evaporator 21, and the temperature detected by this evaporator-temperature sensor can be the combustor evaporator temperature $T_{vap}$.

At S110, the raw fuel is supplied to the reformer 23. Specifically after starting of the startup control, when the temperature of the reformer 23 increases to be ready for the treatment of the raw fuel, the controller 51 changes the supplying target of the raw fuel from the combustor 41 to the fuel treating unit 2 or the reformer 23 so that the reformer 23 generates fuel gas, and continues the warming up of the fuel cell stack 1 with the amount of heat generated from the power generation.

At S111, the controller 51 determines whether the warming up of the fuel cell stack 1 finishes or not. Specifically the controller 51 determines whether the stack temperature $T_{stk}$ reaches a predetermined temperature $T_{stk\_wup}$ or not, the temperature $T_{stk\_wup}$ being for determination of warming-up finishing. When the stack temperature $T_{stk}$ reaches the predetermined temperature $T_{stk\_wup}$, the controller 51 determines that the warming up of the fuel cell stack 1 finishes, and ends the startup control. When the stack temperature $T_{stk}$ does not reach the predetermined temperature $T_{stk\_wup}$, the controller 51 determines that the warming up of the fuel cell stack 1 does not finish, and returns the procedure to S101 to repeatedly execute the processing of S101 to S110. When the startup control finishes, the system then executes normal control in accordance with another routine not shown, and operates the fuel cell stack 1 at the rated output.

In the present embodiment, the controller 51, the second fuel injector 53 and the air compressor 61 make up a "control unit" of the fuel cell system S.

(Actions and Advantageous Effects)

The fuel cell system S according to the present embodiment has the above-stated configuration, and the following describes the actions and advantageous effects from the present embodiment.

Figure 6:
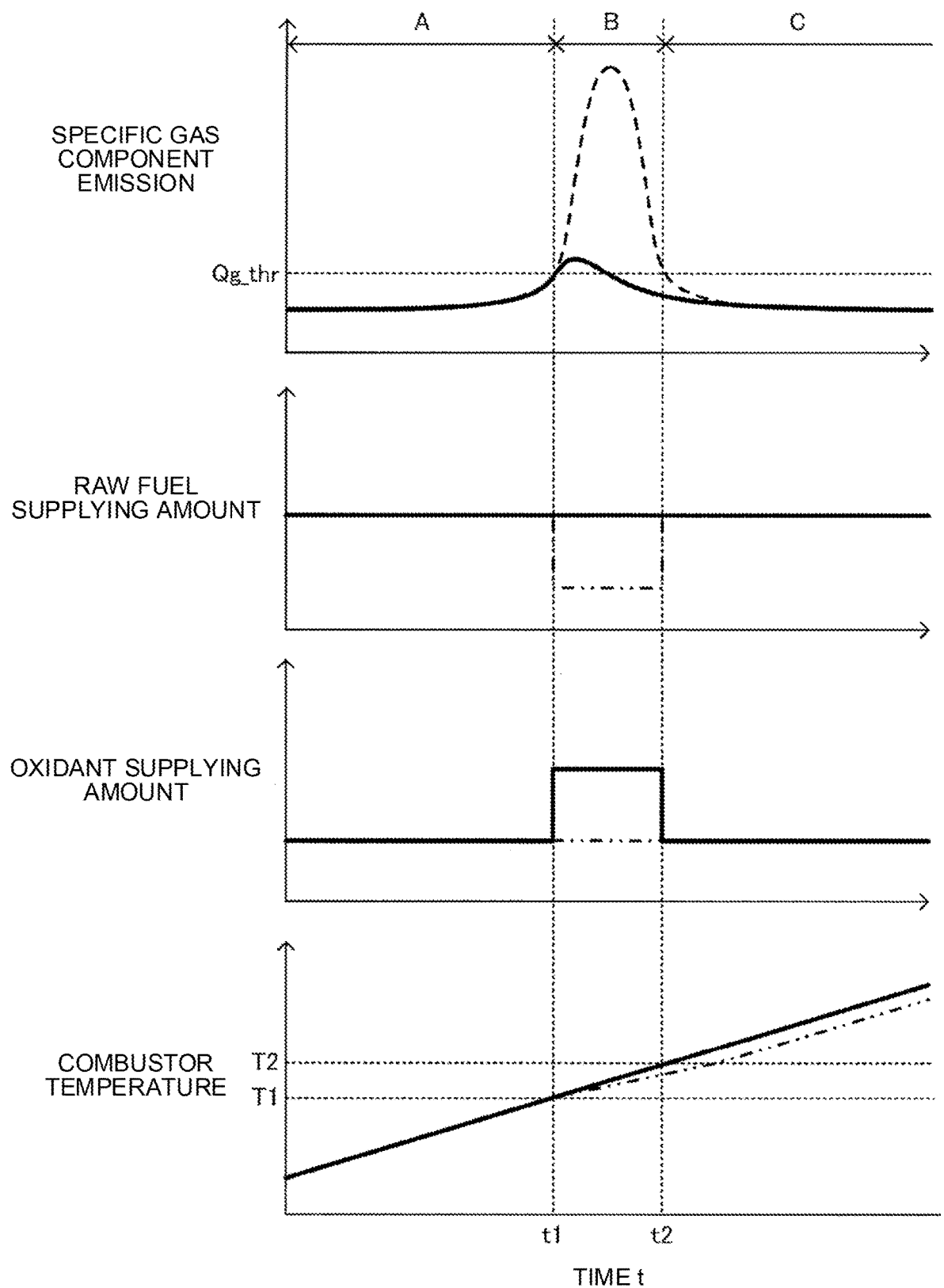
FIG. 6 is a time chart to describe actions and advantageous effects of the startup control.

FIG. 6 shows changes in the emission amount $Q_g$ of a specific gas component, the supplying amount $Q_f$ and $Q_a$ of the raw fuel and the oxidant supplied to the combustor 41, and the temperature $T_{cmb}$ of the combustor 41 at the time of startup of the fuel cell system S. The temperature $T_{cmb}$ of the combustor 41 is the temperature controlling the reaction occurring over a catalyst. In this embodiment, the temperature at the exit of the combustor 41 represents this temperature $T_{cmb}$. Referring to FIG. 6 as needed, the following describes advantageous effects from the present embodiment.

Firstly the present embodiment combusts the raw fuel by the combustor 41 containing catalyst at the time of startup of the fuel cell system S to heat the fuel cell stack 1 and the fuel treating unit 2 (reformer 23) with the amount of heat generated by the combustion so as to promote the warming-up of the entire fuel cell system S.

During the temperature rise of the catalyst, the emission of air pollutants increases due to the combustion of ethanol as the raw fuel, which is indicated with the dashed lines at the first column in FIG. 6. It is known that the generating rate of such air pollutants due to the combustion of the raw fuel can be controlled mainly by the temperature of the catalyst, and progressing of the combustion reaction dominant over the reforming reaction typically suppresses the generation of air pollutants (see durations A and C). On the contrary, when the temperature of the catalyst is within the range between T1 and T2 (duration B) shown in FIG. 6, the reforming reaction turns dominant over the combustion reaction and so the emission $Q_g$ of the specific gas components, such as hydrocarbons and carbon monoxide, increases during this duration.

The present embodiment is then configured so as to increase the air-fuel ratio at a predetermined timing (time t1) after starting of the startup control, because the reforming reaction of the raw fuel at the combustor 41 turns dominant over the combustion reaction, and relatively increase the amount of oxidant to promote the combustion reaction and suppress the air pollutants due to the reforming reaction. This allows a temperature rise the combustor 41 and so the promotion of the warming up while suppressing emission of the air pollutants. In FIG. 6, the thick solid line indicates the decreased emission $Q_g$ of the specific gas components due to the increase in air-fuel ratio.

Secondly the present embodiment determines the arrival of a predetermined timing when the concentration (discharged gas concentration $C_{cmb}$) of the specific gas components in the fuel gas reaches the predetermined concentration $C_{cmb\_thr}$ (time t1) after starting of the startup control and then increases the air-fuel ratio. This enables correct setting of the predetermined timing based on the concentration of the specific gas components and suppresses emission of air pollutants.

Thirdly the present embodiment includes the discharged gas sensor 104, and so enables a determination on the predetermined timing with a simple configuration.

Fourthly as indicated with thick solid line in the third column in FIG. 6, the present embodiment increases the supplying amount $Q_a$ of the oxidant supplied to the combustor 41 to increase the air-fuel ratio, which means no necessity to decrease the supplying amount $Q_f$ of the raw fuel. This suppresses a delay of the temperature rise of the combustor 41 due to the shortage of the amount of heat, and so avoids excessive delay of the startup finishing.

Instead of increasing the supplying amount $Q_a$ of the oxidant, the air-fuel ratio can be increased by decreasing the supplying amount $Q_f$ of the raw fuel. In FIG. 6, the dashed-two dotted lines indicate the state of a change when the air-fuel ratio is increased by decreasing the amount of the raw fuel. Such a reduction of the raw fuel does not need to increase the supplying amount $Q_a$ of the oxidant, and so suppresses the degradation of the catalyst in the combustor 41.

The present embodiment detects the concentration (discharged gas concentration $C_{cmb}$) of the specific gas components, and when this concentration reaches the predetermined concentration $C_{cmb\_thr}$, determines the arrival of the predetermined time and so increases the air-fuel ratio. Such a determination on the arrival of the predetermined time is not limited to this, and can be made based on the temperature of the combustor 41.

Specifically the system includes a temperature sensor to detect the temperature that controls the reaction occurring over the catalyst or the temperature relating to this (e.g., combustor temperature $T_{cmb}$). When the temperature detected by this temperature sensor reaches a first predetermined temperature (temperature T1 in FIG. 6) (timing t1) after starting of the startup control, the controller 51 may determine the arrival of the predetermined time, and increase the air-fuel ratio. After that, when the temperature of the combustor 41 increases more and the temperature detected by the temperature sensor reaches a second predetermined temperature (temperature T2) higher than the first predetermined temperature, then the controller 51 decreases the air-fuel ratio. A specific method to increase the air-fuel ratio may be similar to that described above, including the method of increasing the supplying amount of oxidant to the combustor 41 or the method of decreasing the supplying amount of the raw fuel.

In this way, after starting of the startup control, the controller 51 determines the arrival of the predetermined time, i.e., whether the reaction of the raw fuel at the combustor 41 turns from the dominant state of the combustion reaction to the dominant state of the reforming reaction based on the temperature of the combustor 41. In this way, the determination can be made with a configuration at low cost, including a temperature sensor, to suppress emission of air pollutants. Then when the temperature of the combustor 41 reaches the second predetermined temperature T2, the controller 51 decreases the air-fuel ratio so as to avoid the degradation of the catalyst in the combustor 41 due to an unnecessary increase of the air-fuel ratio.

An elapsed time after starting of the startup may be measured, and when the elapsed time reaches a predetermined time (time t1), the controller 51 may increase the air-fuel ratio. The controller 51 can store in advance the relationship between the elapsed time after starting of the startup and the temperature of the combustor 41 that is obtained through an experiment, for example. The controller 51 then sets the elapsed time t1 and t2 that are estimated time when the temperature of the combustor 41 reaches the predetermined temperatures T1 and T2, respectively. The controller 51 increases the air-fuel ratio when the elapsed time reaches the first predetermined time t1 after starting of the startup control, and decreases the air-fuel ratio when the elapsed time reaches the second predetermined time t2 after the first predetermined time t1.

In this way, the controller 51 may make a determination about the arrival of the predetermined time based on the time. This suppresses emission of air pollutants without necessity of an additional component, such as a sensor.

Other Embodiments

The above embodiment deals with at least one type of gas components of CO, $CH_4$, $H_2$, and $CH_3CHO$ that are generated as the resultants of the reforming reaction as the specific gas component among CO, $CO_2$, $CH_4$, $H_2$, $H_2O$, and $CH_3CHO$ that are potential components of the combustion gas, and determines the arrival of the predetermined time based on the concentration of this component (discharged gas concentration $C_{cmb}$). Such a determination on the predetermined time is not limited to this, and may be made by setting $CO_2$ or $H_2O$ generated as the resultants of the combustion reaction as the specific gas component and based on the concentration of such a component in the combustion gas.

Figure 7:
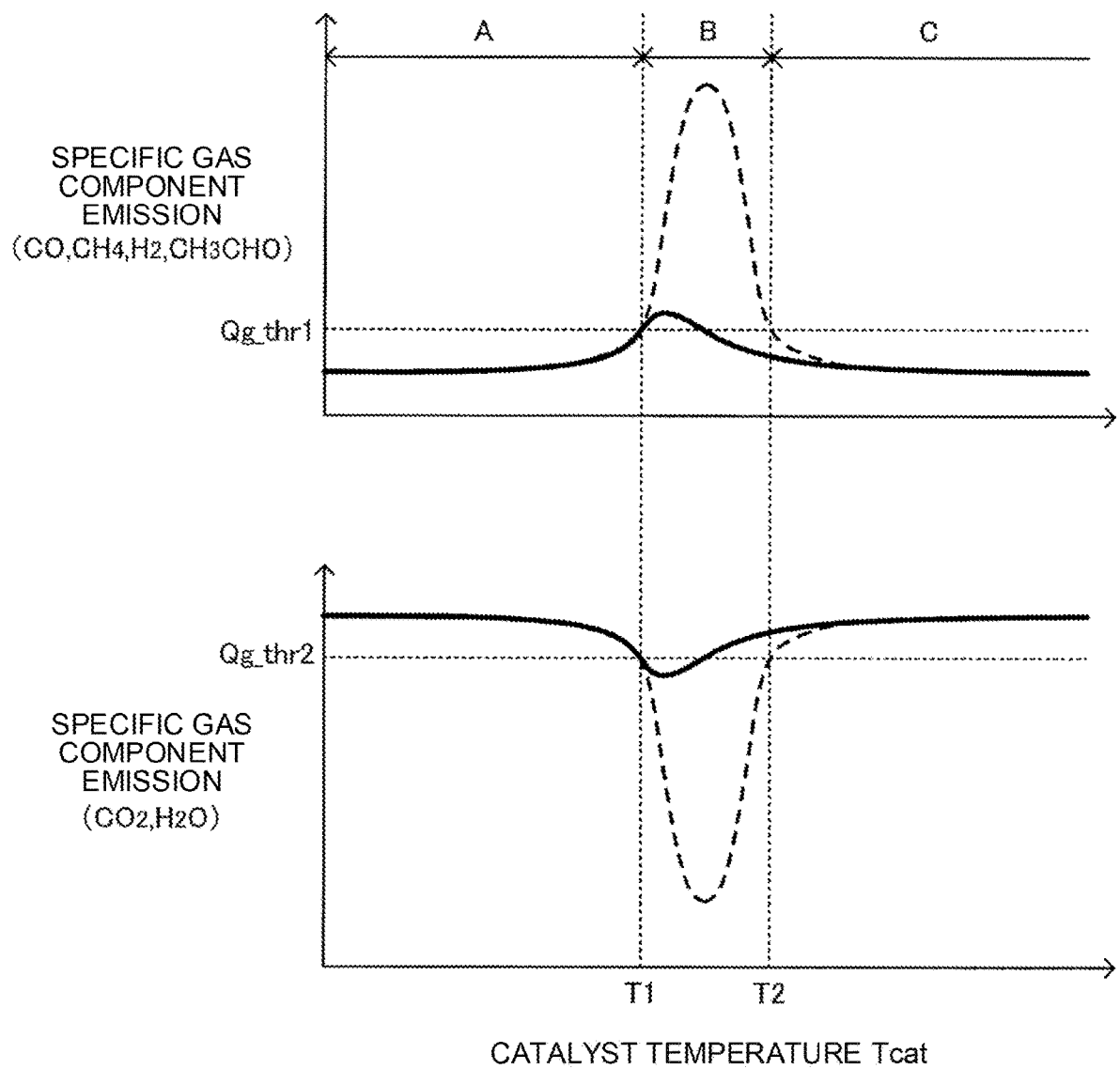
FIG. 7 schematically shows a change in the emission of a specific gas component.

FIG. 7 shows a change of the emission of CO, $CH_4$, $H_2$ and $CH_3CHO$ at the upper part and a change of the emission of $CO_2$ and $H_2O$ at the lower part versus the temperature rise of the combustor 41. In this way, a determination on the arrival of the predetermined time to increase the air-fuel ratio may be based on the amount of emission of a gas component that tends to decrease when the reforming reaction turns dominant.

The above describes the embodiment of decreasing the supplying amount of the raw fuel to increase the air-fuel ratio. To this end, the above embodiment decreases the supplying amount of the raw fuel uniformly at the predetermined time. This is not a limiting way to decrease the amount of the raw fuel to increase the air-fuel ratio, and decreasing and increasing of the amount of the raw fuel may be performed alternately in another embodiment.

Figure 8:
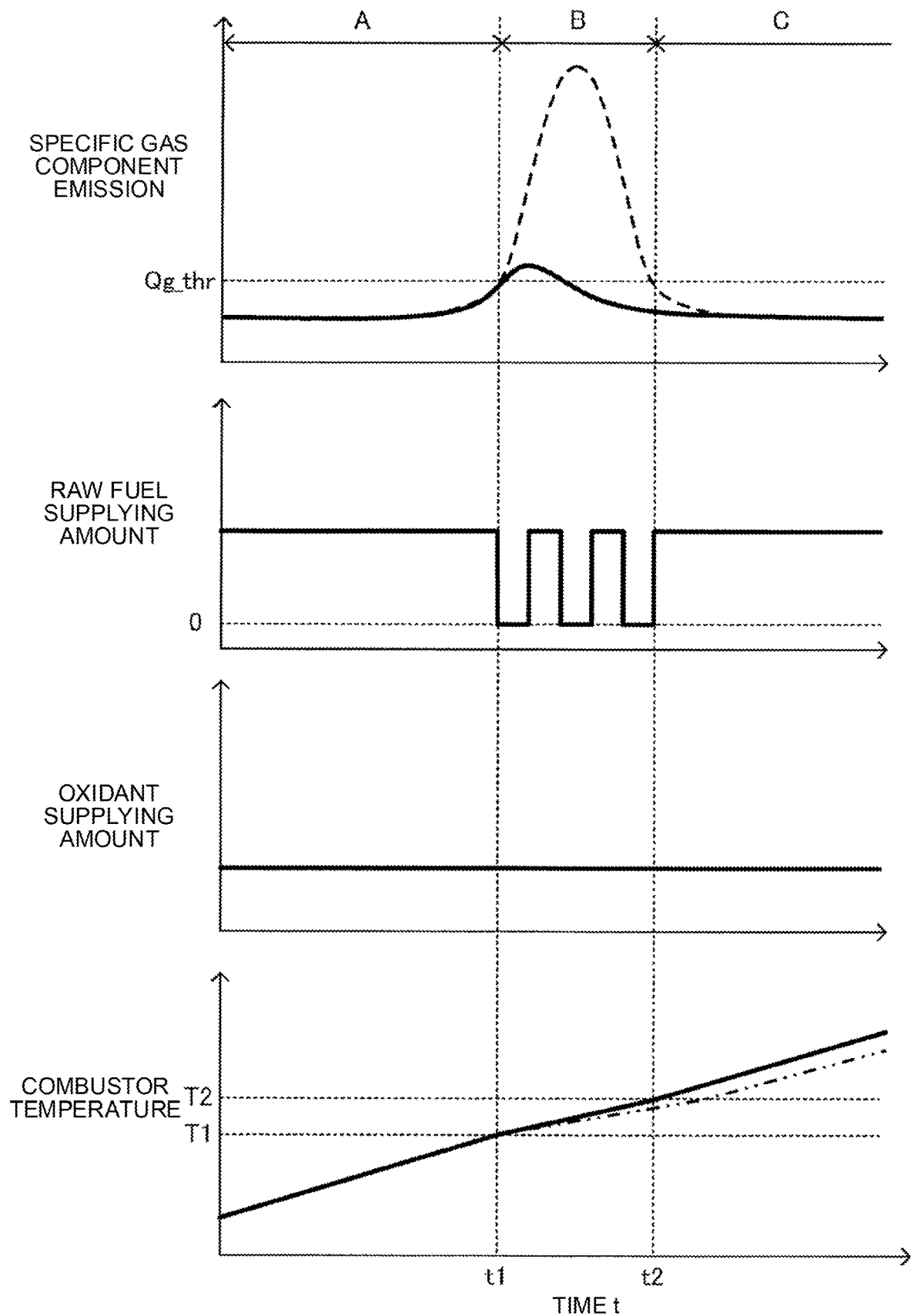
FIG. 8 is a time chart to describe another example of the startup control.

FIG. 8 is a time chart of the startup control according to such an embodiment of the present invention.

In this embodiment, the controller 51 stops the supplying of the raw fuel to the combustor 41 to increase the air-fuel ratio, and then alternately executes restarting and stopping of the supplying. Such stopping of the raw-fuel supplying promotes the combustion reaction due to the increased air-fuel ratio, and so suppresses emission of the air pollutants. Then alternate execution of the restarting and stopping of the supplying of the raw fuel, following the stopping of the supplying, suppresses an excessive temperature rise of the combustor 41 due to the stopping of the raw-fuel supplying while suppressing the degradation of the catalyst in the combustor 41, and avoids a considerable increase in the time required for the startup.

Figure 9:
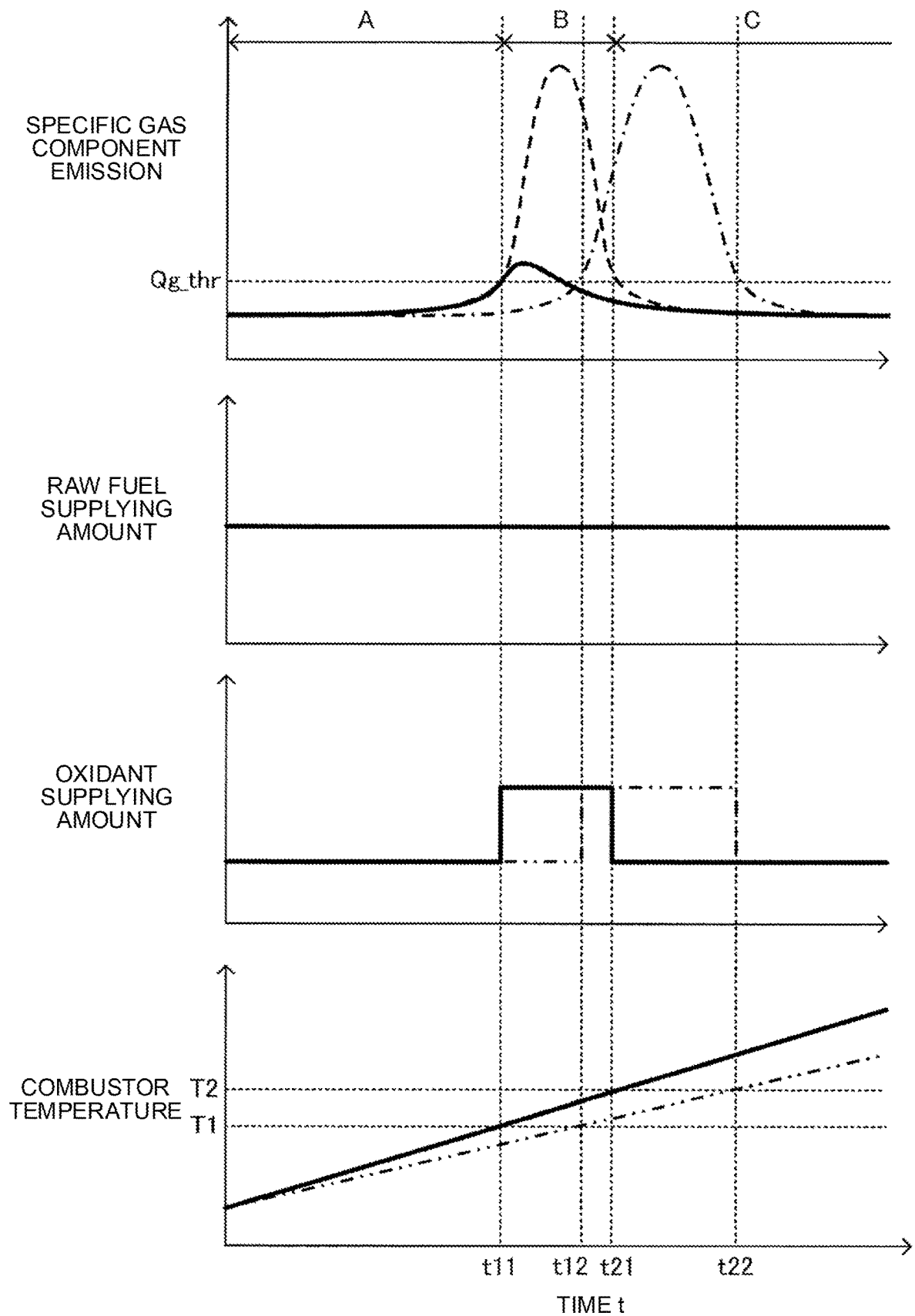
FIG. 9 is a time chart to describe another example of the startup control.

FIG. 9 is a time chart of the startup control according to another embodiment of the present invention.

The controller 51 of the present embodiment determines the arrival of the predetermined time based on the elapsed time after starting of the startup. The controller 51 also determines the degradation of the catalyst in the combustor 41 and corrects the first predetermined time t1 and the predetermined time t2 in accordance with the degree of degradation of the catalyst. Specifically the controller 51 delays the first predetermined time t1 and the second predetermined time t2 for more advanced degradation of the catalyst. More advanced degradation of the catalyst leads to a tendency of a less steep gradient of the temperature rise of the combustor 41 over the time. This embodiment therefore delays the first predetermined time t12 and the second predetermined time t22 for more advanced degradation of the catalyst compared with the time before the degradation, and lengthens the duration B (t12 to t22) to increase the air-fuel ratio, so as to increase the air-fuel ratio at the appropriate time suitable for the degree of degradation and so suppress emission of air pollutants. The degradation degree of the catalyst can be detected based on the gradient of the temperature rise of the combustor 41 after starting of the raw-fuel supplying.

Figure 10:
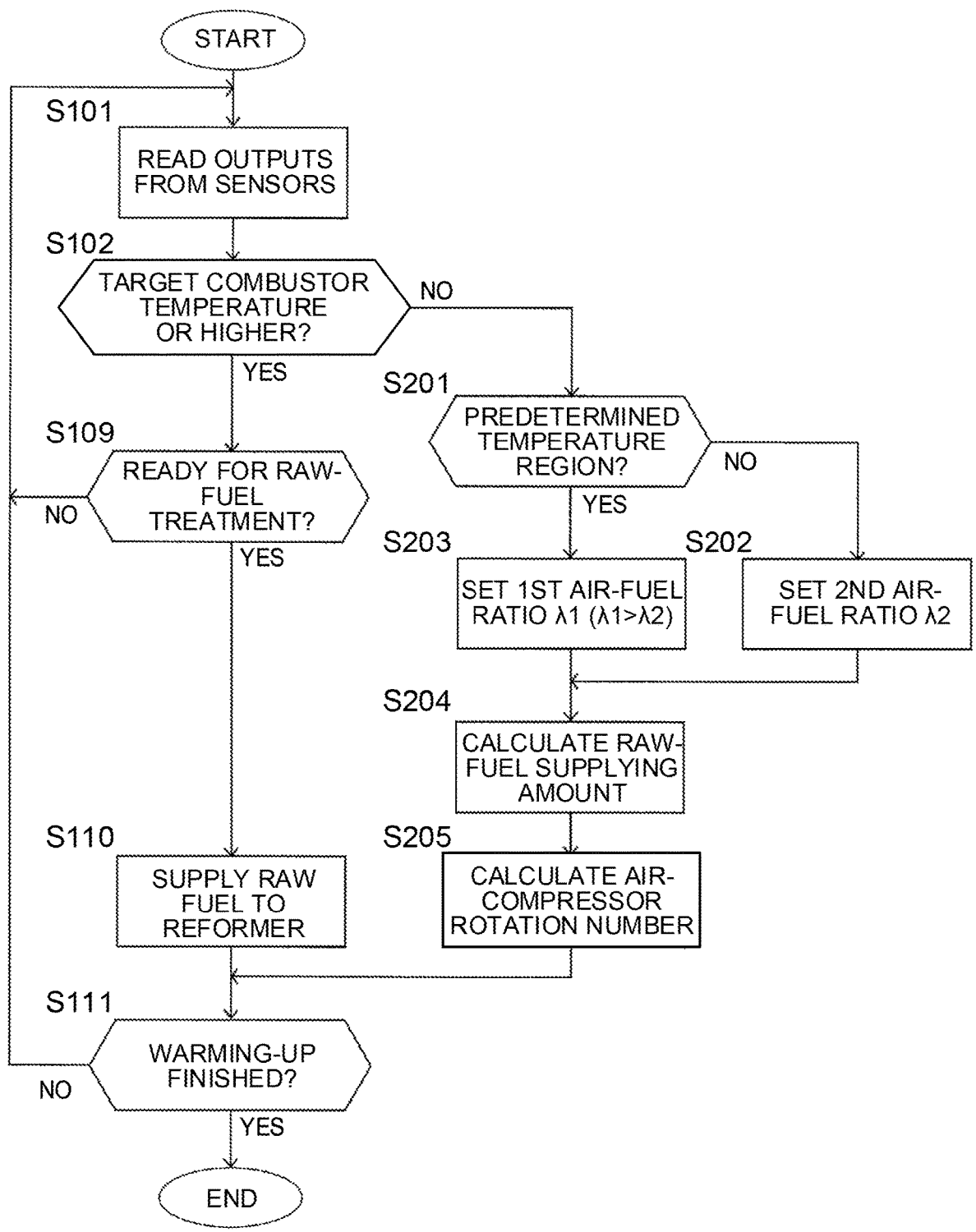
FIG. 10 is a flowchart showing the procedure of the startup control in another embodiment of the present invention.

FIG. 10 is a flowchart showing the procedure of the startup control in another embodiment of the present invention.

Receiving a startup request signal from the startup switch 105, the controller 51 reads a startup control program from the memory, and executes the startup control of the fuel cell system S in accordance with the procedure shown in the flowchart of FIG. 10. The following mainly describes a difference from the startup control (FIG. 5) according to the above-described embodiment.

After starting of the startup control, when the temperature $T_{cmb}$ of the combustor 41 does not reach the target value $T_{cmb\_t}$, the controller 51 determines at S201 whether the temperature of the combustor 41 is in a predetermined temperature range or not, i.e., whether the temperature is in the region (temperature T1 to T2) where the reforming reaction of the reactions at the combustor 41 progresses dominantly, and the emission $Q_g$ of the specific gas components from the combustor 41 exceeds a predetermined amount $Q_{g\_thr}$. Such a determination whether the temperature is in the predetermined temperature range or not can be made by direct detection of the temperature of the combustor 41. This also can be made by detecting the concentration $C_{cmb}$ of discharged gas or based on the elapsed time after the startup starting. When the temperature of the combustor 41 is in such a predetermined temperature range, the procedure shifts to S203 because the reforming reaction is dominant. When the temperature of the combustor 41 is not in the predetermined temperature range, the procedure shifts to S202 because the combustion reaction is dominant.

At S202, the controller 51 sets the air-fuel ratio of the combustor 41 at a relatively low second air-fuel ratio λ2.

At S203, the controller 51 sets the air-fuel ratio of the combustor 41 at a first air-fuel ratio λ1 that is higher than the second air-fuel ratio λ2.

At S204, the controller 51 calculates the supplying amount $Q_{f\_str}$ of the raw fuel (startup supplying amount) to obtain the first air-fuel ratio λ1 or the second air-fuel ratio λ2. As described below, the present embodiment increases the amount of oxidant to increase the air-fuel ratio, and sets the startup supplying amount $Q_{f\_str}$ in accordance with the target temperature ($T_{cmb\_t}$) of the combustion gas generated at the combustor 41 similarly to the above-stated embodiment.

At S205, the controller 51 calculates the target number of revolutions of the air compressor 61 (compressor target number of revolutions) $N_{cmp\_t}$ to obtain the first or the second air-fuel ratio λ1 or λ2. To calculate the compressor target number of revolutions $N_{cmp\_t}$, the controller 51 of the present embodiment calculates the amount of air required to obtain the first or the second air-fuel ratio λ1 or λ2 based on the startup supplying amount Qtr of the raw fuel, and then converts the calculated amount of air into the compressor target number of revolutions $N_{cmp\_t}$ based on the operating characteristics of the air compressor 61.

In this way, the present embodiment is configured to, during the course of a temperature rise of the combustor 41 to the target value (the temperature required to warming-up of the fuel cell system S, e.g., 800° C.) at the time of startup of the fuel cell system S, when the temperature shifts in a predetermined temperature range (during B) where the reforming reaction is dominant at the combustor 41, increase the air-fuel ratio at the combustor 41 compared to in a region other than the predetermined temperature range (during A or C) so as to relatively increase the amount of oxidant and progress the combustion reaction dominantly and so suppress emission of air pollutants.

Figure 11:
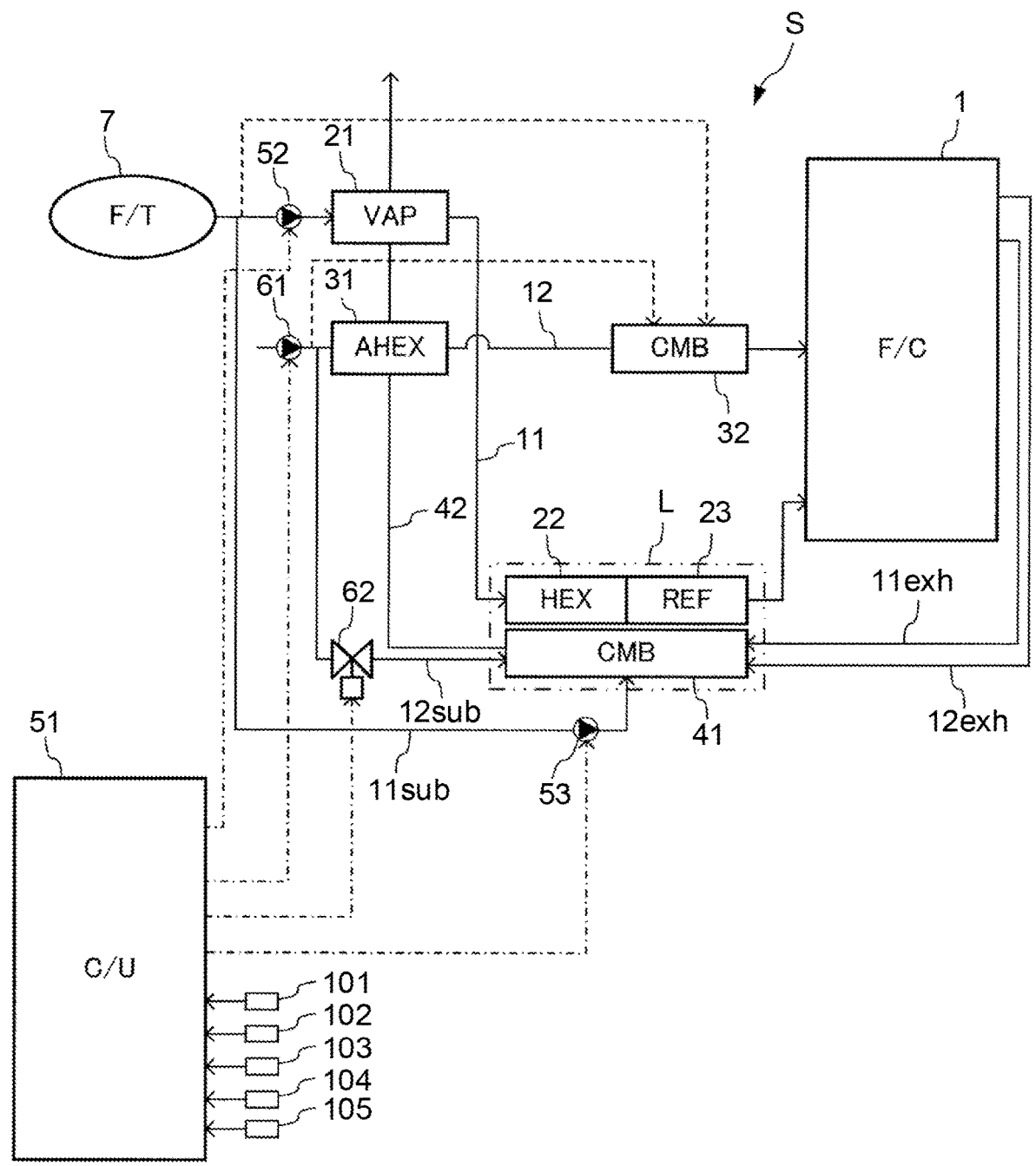
FIG. 11 schematically shows the configuration of a fuel cell system according to another embodiment of the present invention.

The combustor or the catalyst combustor to generate the combustion gas may be disposed not only on the emission side of the fuel cell but also on the supplying side of the fuel cell. FIG. 11 shows such an embodiment. This embodiment includes a catalyst combustor 32 in addition to the combustor on the emission side (hereinafter especially called a "discharged gas combustor") 41, and this catalyst combustor 32 on the supplying side is disposed on the cathode-gas flow path 12. The system is configured to supply raw fuel and oxidant to the catalyst combustor 32 (dashed lines indicate their supplying paths). Specifically ethanol is supplied from the fuel tank 7 to the catalyst combustor 32, and ambient air is supplied to the catalyst combustor 32 via the air compressor 61. The catalyst combustor 32 serves as a heat exchanger that heats oxidant gas (air) flowing through the cathode-gas flow path 12 with the combustion gas. At the time of startup of the fuel cell system S, the catalyst combustor 32 heats air flowing into the cathode-gas flow path 12 due to the air compressor 61 and supplies the heated air to the cathode of the fuel cell. Supplying of the raw fuel and oxidant to the discharged gas combustor 41 may stop, and the catalyst combustor 32 only may warm up the fuel cell stack 1.

The above embodiments of the present invention are merely a part of examples of the application of the present invention, and the technical scope of the present invention is not limited to the specific constitutions of the above embodiments. The above embodiment may be variously changed or modified within the scope specified in the claims.

The invention claimed is:

1. A fuel cell system comprising:
   a fuel cell;
   a catalyst combustor configured to mix and burn an anode off-gas and a cathode off-gas discharged from the fuel cell, and configured to receive raw fuel and oxidant and generate combustion gas of the raw fuel at the time of startup of the fuel cell;
   a reformer configured to reform the raw fuel and generate fuel gas for the fuel cell; and
   a controller programmed to control supplying of the raw fuel and the oxidant to the catalyst combustor;
   the controller programmed to supply the raw fuel and the oxidant to the catalyst combustor at the time of startup of the fuel cell system, and when a reforming reaction of the raw fuel becomes dominant over a combustion reaction of the raw fuel at the catalyst combustor, increase an air-fuel ratio that is a ratio of the oxidant to the raw fuel, compared to the air-fuel ratio before the reforming reaction becomes dominant,
   wherein the controller is programmed to determine that the reforming reaction of the raw fuel turns dominant over the combustion reaction of the raw fuel at the catalyst combustor when
   (i) a concentration of a specific gas component in the combustion gas reaches a predetermined concentration after starting of the startup of the fuel cell system; or
   (ii) a temperature of the catalyst combustor reaches a first predetermined temperature after starting of the startup of the fuel cell system; or
   (iii) an elapsed time after starting of the startup of the fuel cell system equals a predetermined time.

2. The fuel cell system according to claim 1, further comprising an anode-gas flow path that supplies fuel gas to the fuel cell,
   wherein
   the reformer is disposed on the anode-gas flow path, and the catalyst combustor is configured to heat at least one of the fuel cell or the reformer.

3. The fuel cell system according to claim 1, wherein the controller is programmed to increase the air-fuel ratio when the concentration of the specific gas component in the combustion gas reaches the predetermined concentration after starting of the startup of the fuel cell system.

4. The fuel cell system according to claim 3, wherein the raw fuel is ethanol, and
   the specific gas component is at least one of $CO$, $CO_2$, $CH_4$, $H_2$, $H_2O$, or $CH_3CHO$.

5. The fuel cell system according to claim 4, wherein the controller includes a discharged gas sensor disposed to detect a concentration of the specific gas component.

6. The fuel cell system according to claim 1, wherein the controller is programmed to increase the air-fuel ratio when the temperature of the catalyst combustor reaches the first predetermined temperature after starting of the startup of the fuel cell system.

7. The fuel cell system according to claim 1, wherein the controller is programmed to increase the air-fuel ratio when the elapsed time after starting of the startup of the fuel cell system equals the predetermined time.

8. The fuel cell system according to claim 7, wherein the controller is programmed to determine a degree of degradation of a catalyst in the catalyst combustor, and to delay the predetermined time for a more advanced degree of the catalyst degradation.

9. The fuel cell system according to claim 1, wherein the controller is programmed to, after increasing the air-fuel ratio, when the temperature of the catalyst combustor rises to a second predetermined temperature, decrease the air-fuel ratio.

10. The fuel cell system according to claim 1, wherein to increase the air-fuel ratio, the controller is programmed to increase a supplying amount of the oxidant to the catalyst combustor.

11. The fuel cell system according to claim 1, wherein to increase the air-fuel ratio, the controller is programmed to decrease a supplying amount of the raw fuel to the catalyst combustor.

12. The fuel cell system according to claim 11, wherein to increase the air-fuel ratio, the controller is programmed to stop supplying of the raw fuel to the catalyst combustor, and then alternately execute restarting and stopping of the supplying.

13. A fuel cell system comprising:
a fuel cell;
a catalyst combustor configured to mix and burn an anode off-gas and a cathode off-gas discharged from the fuel cell, and configured to receive raw fuel and oxidant and generate combustion gas of the raw fuel at the time of startup of the fuel cell;
a reformer configured to reform the raw fuel and generate fuel gas for the fuel cell; and
a controller programmed to control supplying of the raw fuel and the oxidant to the catalyst combustor;
the controller programmed to supply the raw fuel and the oxidant to the catalyst combustor at the time of startup of the fuel cell system, and during the course of a temperature rise of the catalyst combustor to a target value, when the temperature of the catalyst combustor shifts in a predetermined temperature range where a reforming reaction of the raw fuel is dominant over a combustion reaction of the raw fuel, increasing an air-fuel ratio that is a ratio of the oxidant to the raw fuel, compared to in a region other than the predetermined temperature range,
wherein the controller is programmed to determine that the reforming reaction of the raw fuel turns dominant over the combustion reaction of the raw fuel at the catalyst combustor when
(i) a concentration of a specific gas component in the combustion gas reaches a predetermined concentration after starting of the startup of the fuel cell system; or
(ii) a temperature of the catalyst combustor reaches a first predetermined temperature after starting of the startup of the fuel cell system; or
(iii) an elapsed time after starting of the startup of the fuel cell system equals a predetermined time.

\* \* \* \* \*